April 15, 1941. T. E. MURRAY ET AL Re. 21,772

BOILER AND THE LIKE

Original Filed June 13, 1924 3 Sheets-Sheet 1

INVENTORS.
JOHN H. LAWRENCE
THOMAS E. MURRAY, Deceased
By JOSEPH B. MURRAY and
THOMAS E. MURRAY, Jr. Executors.

By Mains & Rauber ATTORNEYS

April 15, 1941. T. E. MURRAY ET AL Re. 21,772

BOILER AND THE LIKE

Original Filed June 13, 1924 3 Sheets-Sheet 2

INVENTORS
JOHN H. LAWRENCE
THOMAS E. MURRAY, Deceased.
By JOSEPH B. MURRAY and
THOMAS E. MURRAY Jr, Executors.

By Usina & Rauber ATTORNEYS

April 15, 1941. T. E. MURRAY ET AL Re. 21,772

BOILER AND THE LIKE

Original Filed June 13, 1924 3 Sheets-Sheet 3

INVENTORS,
JOHN H. LAWRENCE.
THOMAS E. MURRAY, Deceased
By JOSEPH B. MURRAY and
THOMAS E. MURRAY, Jr. Executors.

By Usina & Rauber ATTORNEYS

Reissued Apr. 15, 1941 Re. 21,772

UNITED STATES PATENT OFFICE 21,772

BOILER AND THE LIKE

Thomas E. Murray, deceased, late of Brooklyn, N. Y., by Joseph B. Murray and Thomas E. Murray, Jr., executors, Brooklyn, N. Y., and John H. Lawrence, Bronxville, N. Y., assignors to Metropolitan Engineering Company, a corporation of New York Original No. 1,993,071, dated March 5, 1935, Serial No. 719,696, June 13, 1924. Application for reissue March 4, 1937, Serial No. 128,972

14 Claims. (Cl. 122—235)

In certain previous applications for patent of Thomas E. Murray (Serial No. 678,443, Patent No. 1,953,768 and others) there are described furnaces with walls of tubular or hollow construction for carrying water to be heated or boiled or steam to be superheated, these being referred to herein generally as water walls or walls of water tubes. It is important in connection with such water walls, particularly by reason of the great heat to which they are exposed in the furnace, the radiant heat of the burning fuel, that there be a free and easy circulation through such walls or tubes. The present invention is directed particularly to the circulating system used in connection with such water walls.

The accompanying drawings illustrate embodiments of the invention.

Figure 1:
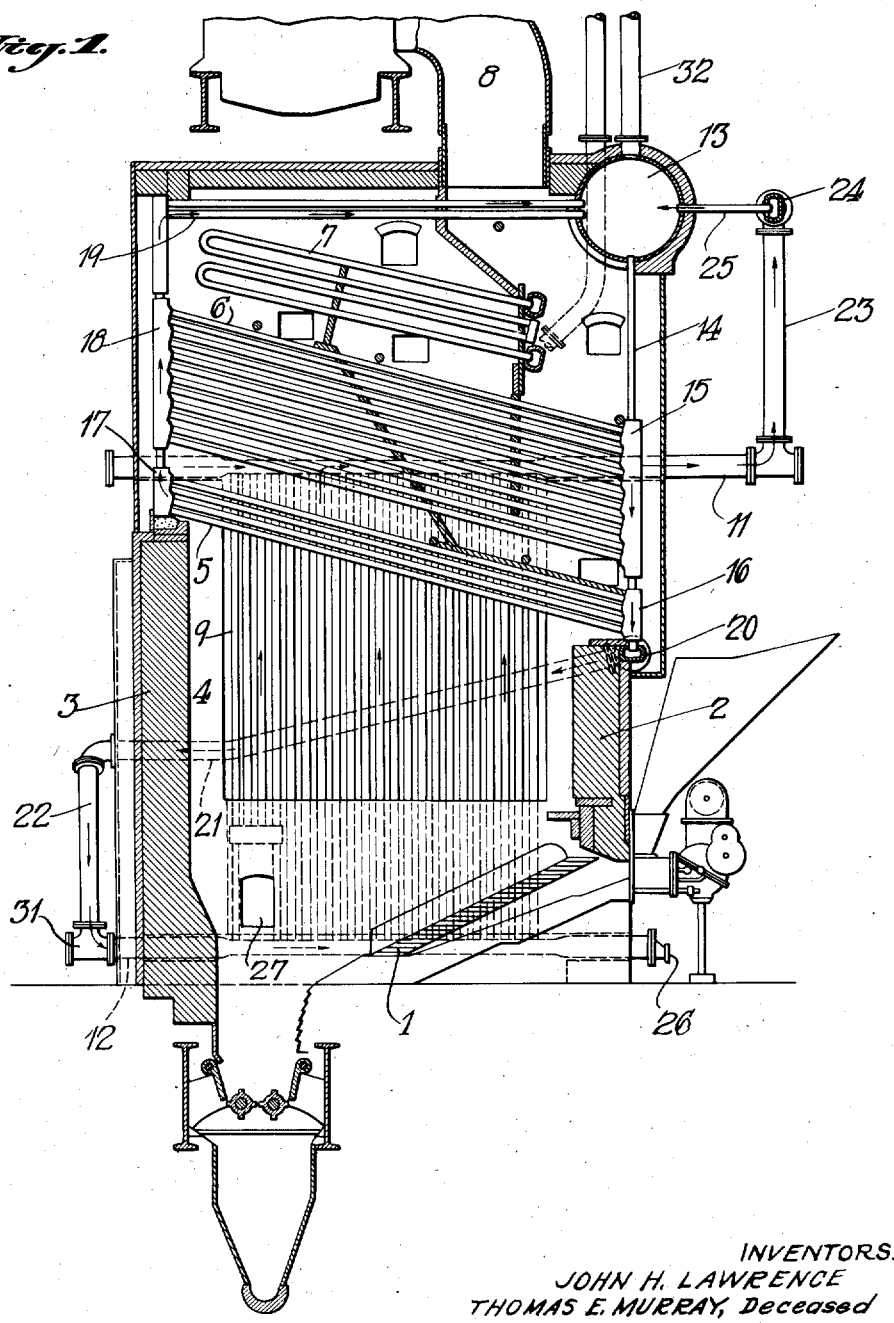
Figure 2:
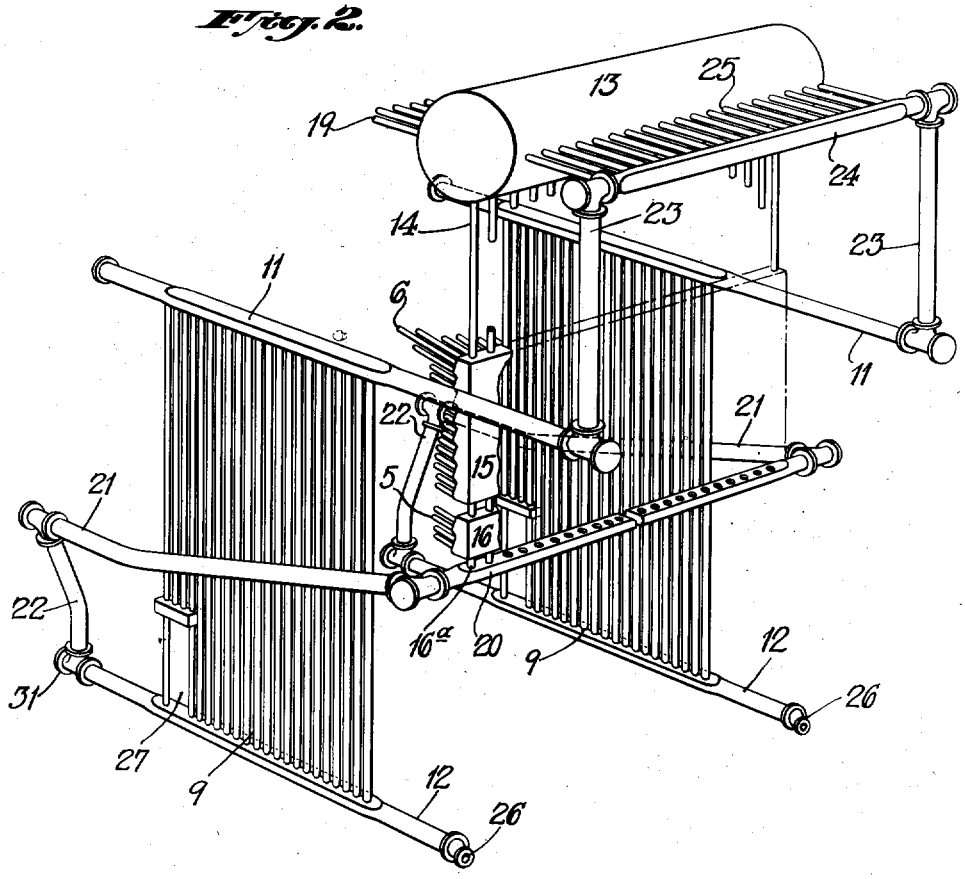
Figure 3:
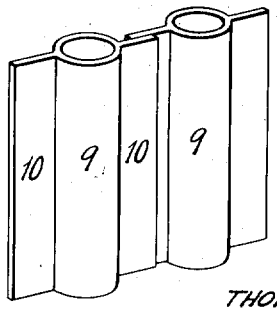
Figure 4:
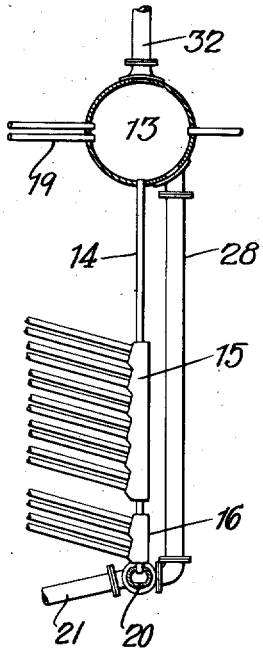
Figure 5:
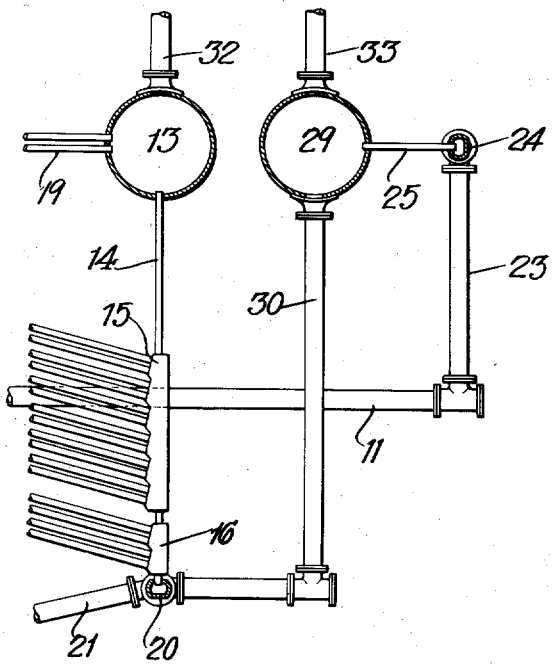

Fig. 1 is a longitudinal vertical section of a boiler; Fig. 2 is a perspective view of a pair of water walls and their connections; Fig. 3 is a perspective view of a detail of the tubes forming the water walls; Figs. 4 and 5 are views similar to Fig. 1 illustrating modifications.

Referring to the embodiment of the invention illustrated, the furnace is provided with a stoker grate 1, a front wall 2, rear wall 3, and side walls enclosing a combustion chamber 4.

Above the combustion chamber are sets of the usual inclined water tubes 5, 6 and 7 constituting the ordinary boiler and superheater tubes, with baffles for properly directing the gases of combustion around the tubes and out finally by the smoke pipe 8 to the exhaust fan or stack.

The inclined, approximately horizontal, tubes are supplemented by sets of vertical tubes 9, arranged at the sides of the combustion chamber of the furnace and exposed directly to the radiant heat of the burning fuel. Preferably, as described in the previous applications above referred to, the tubes 9 are of the kind illustrated in Fig. 3, with longitudinal fins 10 secured to the sides of the tubes and overlapping each other, so as to cover the space between the tubes. These fins provide in effect a greatly increased surface of conducting material exposed to the heat of the furnace and transmitting such heat by conduction to the water within the tubes, and thus greatly increase the efficiency of the boiler as a whole.

Because of the high rate at which the water in these tubes is converted into steam, it is particularly important for efficiency and also to prevent explosions, that they be provided with a reliable circulating system. The set of vertical tubes at each side of the furnace is connected with top and bottom headers 11 and 12, respectively. The water is introduced through the bottom header and is heated and passes out through the top header and thence to a steam drum. The steam is taken off from the drum and the water therein returned to the bottom header. Where these water walls are used in connection with the ordinary inclined sets of tubes, a common steam drum 13 may be used for the several sets of tubes.

The water from the drum 13 passes down through pipes 14 and through headers 15 and 16 in succession to the lower ends of the inclined tubes. The mixed water and steam from these inclined tubes passes by way of headers 17 and 18 and pipes 19 back to the steam drum 13. Ordinarily, below the header 16 there is located a mud drum 20 to collect sediment from the water, where it can be cleaned out from time to time.

According to Fig. 1, the area of the pipes 14 and headers 15 and 16 is made great enough to permit a free circulation of water for the inclined tubes and also of the water for the vertical tubes or water walls of the furnace. The water passes then from the header 16 through a number of branches 16a (Fig. 2) to the mud drum 20, and thence from the drum through downwardly inclined pipes 21 to the back of the furnace, and thence by approximately vertical pipes 22 to the rear ends of the bottom headers 12. From the top headers 11 the water and steam passes out of the front end through vertical pipes 23 and thence to a header or cross-pipe 24, which has a number of small branches 25 leading to the steam drum 13.

The vertical tubes are thus provided each with a complete circulating system which will not be interfered with by any irregularity in the other; and the circulating systems for these water walls of the furnace are complete so as not to be interfered with by any imperfection in the circulation of the regular inclined tubes. At the lower ends of the headers 12 there are shown in Fig. 2 flanges 26 for connecting to the boiler blow-off pipe. There are also shown openings 27 through the lower part of the water walls, for stoker doors. Various other usual or suitable details may be added.

If it be desired, the water supply from the drum 13 to the furnace water walls may be independent of that to the regular horizontal tubes. Fig. 4 illustrates such an arrangement. A pair of separate water pipes 28 parallel the pipes 14 and headers 15 and 16 and carries water directly to the ends of the drum 20, which supplies the furnace water walls.

In fact the furnace water walls may be provided with an entirely separate circulation, including a separate steam drum. Such an arrangement is shown in Fig. 5. The upper header 11 leads through the pipes 23, 24 and 25 to an independent drum 29, from which the steam is taken off at the top and from which the water flows out at the bottom through a pair of pipes 30 to the drum 20 which supplies the water walls as before.

The passing of the water pipe 21 around to the back of the furnace and then down is intended to permit a certain amount of expansion without injury to the joints. The admission of water to one end of the headers 12 and the escape of the water and steam from the opposite end of headers 11 serve to aid in the distribution of the water through the several tubes 9, and tend to prevent any short circuiting of the circulating fluid through only one or a few of the vertical tubes.

Feed water may be admitted at any desired point, as for example at 31, Figs. 1 and 2. The steam from the drum is taken off by a pipe 32 (Fig. 1); and by pipes 32 and 33 (Fig. 5).

The stoker for the grate 1 is of the under feed type. The details are well known. The coal is fed to the grate and forced slowly upward to the top of the mass on the grate. Thus the coal is preheated or partially coked before reaching the exposed surface of the mass where it burns at a very high temperature. The temperature in fact is so high that no ordinary refractory walls are capable of withstanding it very long, and in our experience frequent repairs and replacements of such refractory walls have been necessitated. By the provision of vertical tubes for the side walls or linings thereof, it has been found possible to operate with under feed stokers with practically no deterioration of the side walls. And such stokers may be operated at a high speed in order to increase the output of the boiler.

The vertical water tubes and the under feed stoker co-operate in making it possible to secure the high capacity which is the aim and the chief value of this invention. The water walls provide an increased heating surface compared with the ordinary boiler, and utilize the intense radiant heat which is due to the high temperature, the vertical position of the tubes facilitating the necessary rapid circulation. These side walls of vertical tubes, therefore, permit the use with efficiency of the very high temperatures produced at the surface of the burning fuel of the under feed stoker, and permit this without injury to the side walls and with an enormously increased capacity for a boiler of given size.

Though we have described with great particularity of detail certain embodiments of our invention, yet it is not to be understood therefrom that the invention is restricted to the particular embodiments described. Various modifications may be made by those skilled in the art, without departing from the invention as defined in the following claims.

We claim:

1. A boiler having a furnace with a wall of vertical water tubes and having above the furnace approximately horizontal water tubes, headers at the inlet and at the outlet ends respectively of said vertical tubes, other headers at the inlet and at the outlet ends respectively of said horizontal tubes, a steam drum communicating with the headers at the outlet ends of said tubes, and a common drum communicating with the headers at the inlet ends of the horizontal tubes and also with the headers at the inlet ends of the vertical tubes.

2. A boiler having a furnace with a wall composed of substantially vertical water tubes spaced apart from each other with longitudinal fins extending into the spaces between the tubes so as to provide additional heating surface, said tubes being at the sides of the furnace and being exposed on one side only to the direct radiant heat of the burning fuel, headers at the opposite ends of said tubes, a steam drum and connections from the water space of said drum to the lower end of said headers and from the upper one of said headers to the steam space of said drum.

3. A boiler having a furnace with a wall of substantially vertical water tubes at the sides of the furnace and being exposed on one side only to the radiant heat of the burning fuel, headers at the opposite ends of said tubes and a steam drum, said drum having an outlet from its water space communicating with the lower one of said headers and an inlet to its steam space communicating with the upper one of said headers, in combination with water tubes above the combustion chamber and about which the combustion gases are conveyed and a circulating system therefor; the circulating pipes for the wall of vertical tubes being separate from those for the overhead tubes.

4. A boiler having a furnace with a wall of vertical water tubes and top and bottom headers, a drum above one end of said wall, the top header having an outlet at the same end of the wall which outlet communicates with said drum, the bottom header having an inlet at the opposite end of the wall, and a water pipe extending across the length of the wall and leading from the drum to the inlet end of the bottom header.

5. A boiler having a furnace with side walls of vertical water tubes and top and bottom headers, a steam drum disposed transversely of the vertical planes of said walls at one end of the furnace, the top headers having their only outlets at the same end of the furnace, which outlets communicate with the steam drum, the bottom headers having their only inlets at the opposite end of the furnace, and water pipes extending across the length of said walls and leading from the drum to the inlets of the bottom headers.

6. A boiler having a furnace with a wall of substantially vertical water tubes and top and bottom horizontally extending headers and having a steam drum, the top header having its only outlet at one end, which outlet communicates with the steam drum, and having inlets along its length from the several vertical tubes, the bottom header having its only inlet at one end, opposite to the outlet end of the top header, which inlet communicates with the steam drum, and having outlets along its length to the several vertical tubes so as to produce a rapid circulation well distributed among said tubes.

7. A boiler having a furnace with side walls of substantially vertical water tubes and top and bottom headers, a transversely disposed steam drum, the top headers having their only outlets at one end of the furnace, which outlets communicate with the steam drum, and having inlets along their length from the several vertical tubes, the bottom headers having their only inlets at the opposite end of the furnace, which inlets communicate with the steam drum, and having outlets along their length to the several vertical tubes, so as to produce a rapid circulation well distributed among said tubes.

8. A boiler having a furnace with a wall composed of substantially vertical water tubes spaced apart from each other with metallic closure pieces extending across the spaces between the tubes and in heat conducting contact with the tubes, said tubes being at the sides of the furnace and being exposed on one side only to the direct radiant heat of the burning fuel, headers at the opposite ends of said tubes, a steam drum and connections from the water space of said drum to the lower one of said headers and from the upper one of said headers to the steam space of said drum.

9. A boiler having a furnace with a wall of water tubes at the sides of the furnace exposed on one side to the radiant heat of the burning fuel, headers at the opposite ends of said tubes and a steam drum, said drum having an outlet from its water space communicating with the lower one of said headers and an inlet to its steam space communicating with the upper one of said headers, in combination with water tubes about which the combustion gases are conveyed so that the tubes are heated by convection, and a circulating system therefor, the circulating pipes for the wall of radiantly heated tubes being separate from those for the convection heated tubes.

10. The boiler of claim 9, the radiantly heated tubes being vertical.

11. The boiler of claim 9, the radiantly heated tubes being vertical and the convection heated tubes being horizontal and located above the radiantly heated tubes.

12. A boiler having a furnace with a wall composed of substantially vertical water tubes, said tubes being at the sides of the furnace and being exposed at one side only to the radiant heat of the burning fuel, headers at the opposite ends of said tubes, a steam drum and connections from the water space of said drum to the lower one of said headers and from the upper one of said headers to the steam space of said drum.

13. The boiler of claim 12, said water tubes constituting parts of a metal wall extending completely across the width and exposed to the radiant heat of the burning fuel.

14. The boiler of claim 12, said water tubes constituting parts of a metal wall extending completely across the width and exposed to the radiant heat of the burning fuel, said vertical tubes being shielded at their lower ends from the fire.

JOSEPH B. MURRAY.
THOMAS E. MURRAY, JR.
*Executors of the Estate of Thomas E. Murray, Deceased.*

JOHN H. LAWRENCE.